Patented Dec. 3, 1946

2,411,897

UNITED STATES PATENT OFFICE 2,411,897

PHARMACEUTICAL SOLUTION

Melville Sahyun, Detroit, Mich., assignor, by mesne assignments, to Sterling Drug Inc., Wilmington, Del., a corporation of Delaware No Drawing. Application January 2, 1943, Serial No. 471,172

9 Claims. (Cl. 167—65)

This invention is directed to an improved pharmaceutical product and is particularly concerned with an aqueous solution of amino acids adapted for injection into the human body and stabilized against formation of precipitates, and a method for the preparation of such composition.

Aqueous solutions of amino acids have been administered to humans by intravenous, subcutaneous, intramuscular, and intrasternal injection. While this practice, in the main, has been highly successful in bringing about desired physiological responses, certain disadvantages accrue to the handling of the solutions employed which materially limit the scope of such operation. A principal difficulty heretofore encountered resides in the instability of the standardized and sterile amino acid solutions. Such lack of stability is usually evidenced by a gradual formation of precipitate in the composition whereby its use, for example in parenteral administration, may endanger the well being and even the life of the patient. The exact nature of the insoluble precipitate formed is not known, but it would appear that certain difficultly soluble constituents of the amino acid mixtures, reaction products of the amino acids with constituents of the glass containers in which the compositions are prepared and stored, or inorganic materials dissolved out of such glass containers gradually separate from solution as colloidal particles which by association one with the other or thru loss of electrical charge eventually pass from suspension. This tendency of the compositions in question makes desirable the provision of amino acid solutions of increased stability.

It is among the objects of the present invention to supply means for stabilizing aqueous amino acid solutions against the formation of precipitates. It is a further object to provide compositions stable against the formation of precipitates over periods of months and years. A still further object is to supply a stabilized composition which will retain desirable pharmaceutical properties, for which the human circulatory system will have a high tolerance, and which will be economical of preparation. Other objects will become apparent from the following description of the invention.

I have discovered that aqueous amino acid solutions, and particularly relatively concentrated aqueous solutions, may be stabilized against the formation of precipitates over long periods of time by including in such solution a relatively small amount of an organic hydrophilic protective colloid. This result is particularly desirable where the amino acid solution is to be contacted with glass surfaces during preparation, sterilization, or storage. Such compositions are conveniently prepared by dispersing a mixture of the colloid and amino acids in water, by dispersing a stabilizing amount of the colloid in the previously prepared amino acid solution, or by dissolving the amino acids in an aqueous dispersion of the colloid. In any event, clarification and/or filtration is desirable and the resulting product is subsequently subjected to boiling or autoclaving at temperatures between about 100° C. and the decomposition temperature of the mixture. The ultimate composition so obtained consists of a homogeneous dispersion of the colloidal material in the aqueous amino acid solution and is stabilized against the formation of precipitates.

The expressions "relatively small amounts" and "stabilizing amounts" as herein employed with reference to the protective colloid, refer to a proportion of the latter generally between about 0.25 and 3 per cent by weight of the solution, altho somewhat higher or lower proportions may be employed depending upon the degree to which the composition is subsequently to be diluted. By "relatively concentrated", reference is intended to solutions containing 10 per cent or more by weight of amino acids and generally about 15 per cent.

The present invention is applicable to aqueous solutions of amino acids generally, but a preferred embodiment resides in the mixture of amino acids obtained by the acid hydrolysis of casein and subsequent removal of humin and excess minerals. Such a mixture may be one containing the following acids in approximately the indicated percentages:

| Amino acid | Per cent by weight |
|---|---|
| Glycine | 0.5 |
| Alanine | 2.0 |
| Serine | 0.5 |
| Valine | 5.0 |
| Leucine and isoleucine | 15.0 |
| Tyrosine | 5.0 |
| Phenylalanine | 6.0 |
| Cystine | 0.3 |
| Tryptophane | 1.0 |
| Proline | 8.0 |
| Hydroxyproline | 0.2 |
| Aspartic acid | 4.0 |
| Glutamic acid | 22.0 |
| Hydroxyglutamic acid | 10.0 |
| Histidine | 2.0 |
| Arginine | 5.0 |
| Lysine | 6.0 |
| Methionine | 3.0 |
| Threonine | 5.0 |

The foregoing mixture, may be modified by the inclusion of additional tryptophane if desired. Dilute solutions of the preferred composition as set forth, e. g. from about 0.5 to 2.0 per cent, have been recommended in the treatment of febrile diseases, hyper-metabolic states, acute infections of the liver, hypoproteinemia from inanition or carcinoma, etc., and particularly by parenteral administration. Similarly solutions of a single amino acid or of mixtures of two or more may be employed.

A clear distinction is to be appreciated as between the hydrophilic organic protective colloids of the present invention and such inorganic materials as bentonite, silica gel, and various other gel forming earths, inorganic salts and hydroxides, etc. These materials are not well adapted to be employed as herein described by reason of the presence of solid or difficultly dispersible constituents therein, the possibility of undesirable reaction between such materials and the amino acids, and the uncertain tolerance of the body for such colloids when introduced by injection. In contrast, the colloids included in the present composition have been found not objectionable for the use indicated.

Among the hydrophilic organic protective colloids which may be employed in accordance with the present invention are gelatin, starch, pectin, alginic acid, alginates, etc. A preferred embodiment resides in those colloid forming products identifiable as poly-saccharides, of which pectin has been found most suitable. The latter product may be employed in amount of from 0.25 to 2.0 per cent by weight of concentrated amino acid solutions to obtain compositions stabilized against precipitate formation for long periods of time. Also humans and animals have been found to have a high tolerance for pectin when the latter is administered parenterally as a constituent of amino acid solutions at the dilutions and concentrations required.

With reference to the present description, it is to be understood that the aqueous amino acid compositions referred to, whether as concentrates or as solutions sufficiently dilute for parenteral administration, may contain glucose, or the conventional saline constituent, or both. Thus a stabilized 15 per cent by weight amino acid solution may be modified with an amount of glucose or glucose solution required to form a composition for injection containing the desired concentration of amino acids and from 5 to 10 per cent of glucose. Similarly the stabilized amino acid concentrates may be diluted with saline solution. In an alternate procedure, glucose and/or saline may be incorporated in the amino acid concentrate provided only that their presence not adversely affect the solubility of the amino acid constituents and the stability of the mixture.

The following example illustrates the invention but is not to be construed as limiting the same:

Example 1

50 grams of pectin was added portionwise and with stirring to 10 liters of approximately 15 per cent by weight aqueous amino acid solution. The resulting mixture was stirred for one hour and thereafter autoclaved at about 120° C. and under 15 pounds pressure for 30 minutes or longer. The mixture was then cooled to room temperature, filtered, and re-autoclaved to insure complete sterility. The resulting product was in the form of a clear liquid. A portion of this composition was packaged in glass and found to be stable against formation of precipitates for over seven months. Control compositions in which pectin was omitted formed precipitates crystallizing and settling out along the surfaces and at the bottom of the glass containers. The composition containing the pectin was diluted as hereinbefore described and administered parenterally to animals and humans without ill effect attributable to the pectin constituent.

Example 2

To 200 grams of pectin enough pure ethyl alcohol is added to cover up the solid. It is thoroughly stirred and allowed to stand for 30 minutes or longer if desired. Excess alcohol is decanted. The pectin saturated with alcohol is slowly introduced into 10 liters of warm freshly double distilled water with constant stirring. The acidity of the mixture is adjusted to about pH 3.8 (preferably between about 3.0 and 4.0) and stirring continued until a suitable homogeneous solution is formed. The pectin sol is next autoclaved for 30 minutes or longer if necessary and clarified by filtration. To the clear filtered pectin an equal amount of a 10 per cent solution of a mixture of amino acids is introduced and mixed. The mixture then consists of a colloid of 5 per cent amino acids in 1 per cent pectin sol. It is filtered and sterilized either by autoclaving or filtration through well known bacteria filters such as Seitz, Berkefeld, Mandler, Chamberland, etc. The composition is finally tested for sterility, pyrogens, etc., before parenteral administration.

In view of its viscosity, colloidal osmotic pressure, and nutriment value, a mixture of amino acids and pectin may be employed as a blood substitute or as a blood plasma substitute to furnish protein requirement.

Pectin may be partially hydrolyzed when used according to the present invention and as herein used the term "pectin" includes pectin per se and its hydrolytic degradation products.

I claim:

1. A method for stabilizing aqueous amino acid solutions against formation of precipitates which includes the steps of dispersing a small amount of an organic hydrophilic protective colloid in the solution, and thereafter heating the solution to a temperature between 100° C. and the decomposition temperature of the mixture.

2. A method for stabilizing aqueous amino acid solutions against formation of precipitates which includes the steps of dispersing from 0.25 to 3.0 per cent by weight of pectin in the solution, heating the solution to a temperature between 100° C. and the decomposition temperature of the mixture, and thereafter filtering the composition.

3. A clear aqueous solution comprising an essential amino acid and a stabilizing amount of a wholly organic hydrophilic protective colloid, said solution being adapted for injection into the human body and being characterized (1) by the property of remaining free of insoluble matter for a longer period during storage than does a solution of amino acid identical therewith but containing no wholly organic hydrophilic protective colloid, (2) by the substantially complete lack of undesirable physiological effects due to the presence of said colloid when administered parenterally, and (3) by the exertion of the normal physiological effect of the amino acid when so administered.

4. A solution as claimed in claim 3 wherein the protective colloid is a polysaccharide hydrophilic protective colloid.

5. A solution as claimed in claim 3 wherein the protective colloid is present in an amount of from about 0.25 to about 3.0 per cent by weight of the solution.

6. A solution as claimed in claim 3 wherein the essential amino acids are present in an amount of at least 10 per cent by weight of the solution.

7. A solution as claimed in claim 3 wherein the protective colloid is pectin.

8. A solution as claimed in claim 3 wherein the amino acid content is a mixture of amino acids obtained by the acid hydrolysis of casein.

9. A pharmaceutical product in the form of a clear aqueous solution of essential amino acids stabilized against the formation of a precipitate during storage by the presence of a wholly organic hydrophilic protective colloid, said solution being characterized by the substantially complete lack of undesirable physiological effects due to said colloid when administered parenterally and by the exertion of the normal physiological effect of the amino acids when so administered.

MELVILLE SAHYUN.